June 17, 1924.

A. W. RADITCH 1,498,199

PORTABLE CRANK PIN TURNING MACHINE

Filed Aug. 20, 1923

Inventor
Andrew W. Raditch

Patented June 17, 1924.

1,498,199

UNITED STATES PATENT OFFICE.

ANDREW W. RADITCH, OF MADISON, WISCONSIN.

PORTABLE CRANK-PIN-TURNING MACHINE.

Application filed August 20, 1923. Serial No. 658,279.

*To all whom it may concern:*

Be it known that I, ANDREW W. RADITCH, a citizen of the United States, and resident of Madison, in the county of Dane and State of Wisconsin, have invented certain new and useful Improvements in Portable Crank-Pin-Turning Machines; and I do hereby declare that the following is a full, clear, and exact description thereof.

This invention relates to portable crank pin turning machines.

Objects of this invention are to provide a machine which is portable and which may be used to turn crank pins after they have been permanently positioned; to provide a machine of this type which may be operated from a portable motor; and to provide automatic means for feeding the cutting tools at a uniform rate along the crank pin.

Further objects are to provide a machine for turning crank pins, which is so constructed that it will automatically center itself, which may be stopped in its forward feed at the time that the cutting tools arrive at the crank face, and to provide for supporting and accurately guiding the rotary portions of the device.

An embodiment of the invention is shown in the accompanying drawings, in which.

Figure 1:
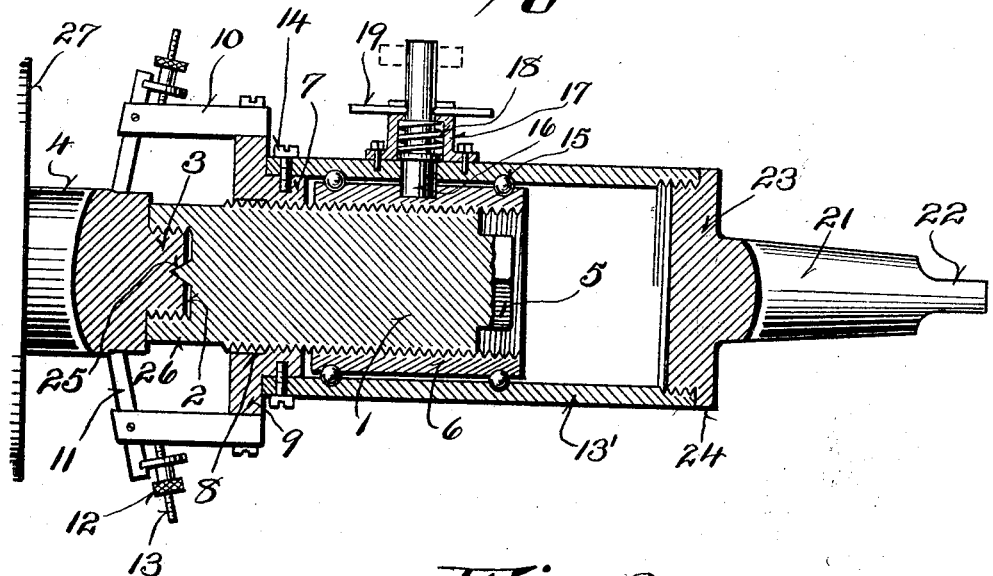
Figure 1 is a longitudinal sectional view through the machine, such figure corresponding to a section on the line 1—1 of Figure 2.

In practising this invention, a support, consisting of a solid pin 1, is employed and is provided with an interiorly threaded recess 2, which is secured upon the threaded extension 3 of the crank pin 4. This member or support 1 is provided with a square or hexagonal end 5, so as to facilitate the manipulation of the part by means of a wrench, thus permitting the member to be tightly screwed on the crank pin extension. Upon the support an interiorly threaded sleeve 6 is screwed and accurately fits the external threads 2 of the member 1. A second sleeve 7 is mounted as a continuation of the sleeve 6 and is also provided with internal threads throughout a portion of its inner surface. However, it is cut away, as indicated at 8, adjacent its outer end. This second sleeve is provided with an outwardly projecting flange 9, which is transversely slotted at a plurality of points and carries the tool supporting bars 10. These tool supporting bars are adapted to carry a plurality of turning tools 11 which are adjustably held by means of the adjusting nuts 12 mounted upon threaded pins 13 extending outwardly from the tool supporting bars.

Figure 2:
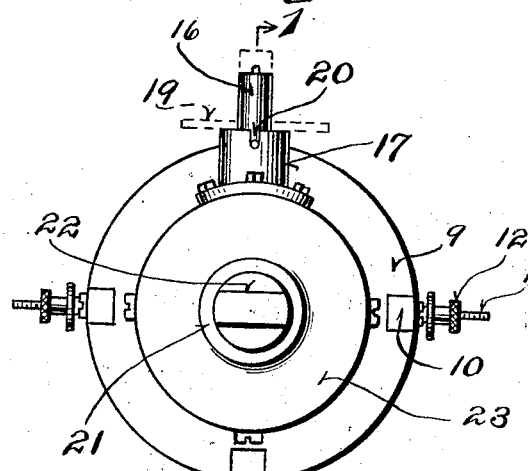
Figure 2 is a rear end view of the machine, such view being taken from the right hand end of Figure 1.

A larger sleeve 13 surrounds the sleeve 6 and is spaced therefrom and surrounds the sleeve 7 and is rigidly attached thereto by means of a plurality of screws 14. Channels are cut in the sleeve 6 and in the interior of the sleeve 13 and a plurality of balls 15 are mounted in the channels so as to have a ball bearing between the sleeves 6 and 13. However, the sleeve 6 is normally rigidly attached to the sleeve 13 by means of a plunger 16, which is guided by a casing 17 bolted to the outer side of the sleeve 13. This plunger is urged downwardly by means of a spring 18 and is provided with laterally projecting rods 19, which normally fit within a slot 20 formed in the casing 17. However, when it is desired to disconnect the sleeve 6 from the sleeve 13, it is merely necessary to partially withdraw the plunger 16 and to rotate it to 90°, as shown in dotted lines in Figure 2, thus allowing the rods 19 to rest on the outer surface of the casing 17 and holding the plunger in retracted position.

The device is driven by means of a taper shank 21, which is preferably tapered and provided with a flat tongue 22 adapted to be received by a suitably formed socket or similar member of a drive motor. This taper shank has integrally formed therewith a forward disc 23, which is screwed tightly into the sleeve 13, and if desired may be provided with a shoulder 24 which abuts the rear edge of the sleeve 13, as shown in Figure 1.

If desired, the support 1 may be provided with a projecting conical portion 25 adapted to fit within the center hole of the crank pin. This support, it will be noted from Figure 1, is provided with a portion 26 adjacent the crank pin which is free from threads.

The operation of the apparatus is as follows:—With the parts in the position shown in Figure 1, suitable driving force is applied through the taper shank 21, and the device, including the sleeves 13, 6, and 7, are rotated, thus rotating the tools about the crank pin and thus machining the outer surface of the crank pin. Due to the threaded connection between the sleeves 6 and 7 and the support 1, the tools are gradually advanced towards the face 27 of the crank. However, before they quite arrive at the face, the sleeve 7 runs off the threads of the support 1 and occupies the cleared space 26 of the support. At this instant the plunger 16 is retracted, thus operatively disconnecting the sleeve 6 from the sleeves 13 and 7, and consequently the tools 11 continue to revolve without longitudinally advancing. Thus the chipped or rough termination of the turning cut is prevented from forming—that is to say, instead of stopping the device at the instant that the forward feed stops, it is permitted to rotate and consequently an even, smoothly turned final cut is made.

It will thus be seen that a portable crank pin turning machine has been provided, which is eminently suited to the turning of crank pins after they are in position without the necessity of removing the pin or the crank.

It will further be seen that extremely accurate work may be done by this machine, as it is automatically centered correctly with reference to the crank pin.

It is still further to be noted that the device is freely portable and is adapted to turn crank pins of any desired diameter.

Although the invention has been described in considerable detail, it is to be understood that it may be variously embodied and is to be limited only as claimed.

I claim:—

A machine for turning crank pins having projecting threaded portions, said machine comprising an externally threaded support having an internally threaded socket adapted to be screwed upon the threaded projection of said crank pin, a threaded sleeve cooperating with the threaded support, a larger sleeve surrounding said threaded sleeve, ball bearings between said sleeve, means for detachably joining said sleeves, and a tool carried by said larger sleeve and adapted to operate upon said crank pin.

In testimony that I claim the foregoing I have hereunto set my hand at Madison, in the county of Dane and State of Wisconsin.

ANDREW. W. RADITCH.